United States Patent Office 2,839,819
Patented June 24, 1958

2,839,819

WELDABLE SINTERED MOLYBDENUM

William N. Platte, Boston, Pa., assignor to Westinghouse Electric Corporation, East Pittsburgh, Pa., a corporation of Pennsylvania No Drawing. Application July 12, 1957
Serial No. 671,408

2 Claims. (Cl. 29—182)

This invention relates to the welding of molybdenum and in particular is concerned with weldable sintered molybdenum articles.

The properties of molybdenum are such that the metal is potentially of considerable interest for high temperature applications. For maximum use of molybdenum it is desirable to be able to work and use it in various conventional ways. One requirement for maximum utilization is that it may be welded by a technique permitting flexible applications.

Arc-cast molybdenum can be welded by electrical resistance and arc welding techniques though most of the resulting welds are characterized by low ductility. Sintered molybdenum, on the other hand, can only be welded by the percussive process. That process is limited to the forming of butt joints and even those must be in small sections.

Sintered molybdenum is characterized by a fine grain structure and, therefore, a large grain boundary area. Sintered molybdenum can be cold worked at significant yields. To take advantage of these characteristics it would be desirable to be able to weld sintered molybdenum by use of a known technique by which a variety of welds may be made. To my knowledge, the only satisfactory welding of sintered molybdenum that has been accomplished heretofore were butt joints made by the percussive process and butt joints formed by a flash welding process.

It is therefore a major object of the present invention to provide a sintered molybdenum article that can be welded readily by techniques that have been used heretofore and by which a variety of joints may be made.

I have discovered, and it is on this discovery that the invention is in large part predicated, that by incorporating a small quantity of titanium powder in powdered molybdenum and sintering the resultant mixture, a product is obtained that may readily be arc welded. The resultant article may be welded in a variety of welds that are ductile, do not crack over a wide temperature range and are of negligible porosity thus permitting the use of sintered molybdenum for many high temperature applications. The invention is considered to be particularly surprising because oxygen in molybdenum has been considered to be the reason that sintered molybdenum could not be arc welded satisfactorily, yet the use of other known deoxidizers therein, such as carbon, aluminum, tantalum and niobium, does not bring about the satisfactory results obtained upon using titanium. While I do not desire to have my invention limited by theory, it is my belief that titanium is effective because it forms an oxide that is stable at welding temperatures, i. e. at about 4700° to 4800° F., and does not form complete grain boundary films in weld metal.

The weldable sintered molybdenum of this invention contains titanium in an amount of about 0.2 to 0.5 percent by weight, based on the weight of the resultant mixture. Moreover, the titanium must be mixed with the molybdenum in a specified manner, for otherwise the desired results will not be obtained. I have found that the titanium powder must be admixed with about 15 to 25 percent, and suitably about 20 percent, by weight of water for satisfactory results. Here, too, there is seemingly an anomaly for if it be supposed that the water protects the powder from the oxygen in air, other means of protection, such as the use of other liquids or even a vacuum treatment of the titanium should be as effective as water for that purpose. However, such is not the case. For example, it has been found that the longer titanium-molybdenum power is vacuum treated in an effort to dry it, the poorer are the welding results upon use of that mixture in producing sintered molybdenum articles.

The products of the invention are prepared by mixing thoroughly the titanium powder, containing the specified quantity of water, with molybdenum powder, pressing the mixture to the desired density and then sintering the pressed article in vacuum. In preparing compacts, a hydrogen-reduced commercial molybdenum powder of average particle size, for example that passes a 325-mesh screen, and titanium powder, suitably of similar particle size, which contains about 20 percent of water, are mixed and are then pressed at a pressure of about 10,000 p. s. i. to a density on the order of 95 percent. The pressed article is then vacuum sintered at a temperature of at least 1700° C., preferably about 2000° C., but below the melting point of the mixture. To minimize oxygen pick-up, all handling and processing, particularly of the molybdenum powder, desirably are carried out under inert conditions such as in an argon or other inert gaseous atmosphere or in a vacuum, provided that the water is not removed from the titanium prior to sintering.

Sintered molybdenum compacts that contain 0.2 to 0.5 percent of titanium and which are prepared according to the procedure just described can be arc welded using, for example, a gas shielded arc of a tungsten electrode.

For purposes of testing a material to see if it could be welded successfully, a surface bead along a plane of the material was made because it was known that the difficulties encountered under such welding conditions would be as severe as any that would be encountered under commercial welding practices.

In a typical procedure for producing compacts according to this invention, commercial molybdenum powder was treated with dry hydrogen to insure that its oxygen content was minimized. The reduced powder was then mixed with titanium powder that contained 20 percent by weight of water. Mixing was accomplished in an argon-filled container. Compacts, having the dimensions of 3½ x 1½ x ¾ inches, were then pressed from the powder at a pressure of 10,000 p. s. i. The compacts were then vacuum sintered for about four hours; the furnace temperature during sintering was maintained between 1950° to 2100° C. The resultant compacts were then cross-rolled to a transverse section 2 x 0.060 inches, taking eight passes with intermediate reheats to 1100° C., using an initial reduction of 10 percent and a total reduction of 85 percent.

Two compacts containing titanium within the limits of the invention were prepared according to the procedure just described. For comparison purposes a third sintered molybdenum compact that contained a higher quantity of titanium and a fourth one that contained no titanium at all were prepared. The analytical and processing data on the titanium-containing compacts are as follows:

Table 1

| Sample | Analysis | Sintering Time, hrs. | Sintering Temp., °C. | Final Thickness (in.) |
|---|---|---|---|---|
| A | Ti 0.20<br>N 0.004<br>O 0.05 | 4 | 2,100 | 0.058–0.059 |
| B | Ti 0.46<br>N 0.004<br>O 0.01 | 4 | 2,100 | 0.059 |
| C | Ti 1.87<br>N 0.014<br>O 0.04 | 4 | 2,100 | 0.059 |

Fusion weld beads on these plate compacts were made in a controlled atmosphere welding chamber under a positive pressure of about 30 mm. of mercury. A direct current arc was struck between a tungsten electrode and the molybdenum plate as an anode. The arc was gas shielded and was operated in an atmosphere of the same gas. The distance between the tungsten electrode and the plates was maintained at 3/32 inch. Welding data as follows:

Table II

| Sample | Current Amp. | Voltage | Arc Travel Speed in 1 min. |
|---|---|---|---|
| A | 180 | 12.5 | 6 |
| B | 175 | 13.5–14 | 6 |
| C | 175–180 | 13. | 6 |
| D [1] | 175 | 11.5 | 6 |

[1] 100= Mo, no Ti addition.

The weld in the control sample, D, was clean and bright; however, upon solidification it cracked throughout its full length and showed evidence of porosity. Sample A showed no cracks at all, and the weld was clean and bright though there were a few black specks along the edge of the bead. The weld of sample B was a clean, gray-silver narrow bead without any evidence of cracks. Sample C showed no cracks and the weld was clean and bright; however, the weld was rough with a weld depression at the side of the bead near its middle. It is thus apparent that only those compacts that conformed to the invention (specifically A and B), were capable of being fusion welded without encountering cracks or porosity, characteristics that are entirely unsatisfactory for commercial applications.

The welds were cut into bend test specimens and tested over a range of temperatures. The data obtained show that the welds on materials of this invention, that is on the compacts containing 0.2 to 0.5 percent of titanium, had the most desirable properties. Specifically, the welds on compacts A and B were not completely brittle until a low temperature on the order of —130° to —160° F. was reached, and they were ductile (i. e. resulted in a 100° bend or 0.4 in. deflection) at 320° F. Compacts with a high titanium content, i. e., on the order of 1.88 percent titanium, showed completely brittle behavior at 0° F. and did not become fully ductile until temperatures of 400° F. and higher were reached. It is thus apparent that compacts made in accordance with this invention may be welded with the result that the welds produced permit use of the article over a temperature range that permits handling without damage at room temperature and the deflection of the weld, under load for example, at a temperature as low as about 320° F.

In accordance with the provisions of the patent statutes, I have explained the principle of my invention and have described what I now consider to represent its best embodiment. However, I desire to have it understood that the invention may be practiced otherwise than as specifically described.

I claim as my invention:

1. A sintered molybdenum compact that, as prepared, can be arc welded that consists of the compact prepared by blending with a hydrogen-reduced molybdenum powder about 0.2 to 0.5 percent by weight of titanium powder, said titanium powder being admixed with water in an amount of about 15 to 25 percent by weight based on the titanium, pressing the powder mixture to form a compact, and vacuum sintering the resultant compact at an elevated temperature of above about 1700° C. but below the melting point of said mixture.

2. A method of preparing sintered molybdenum articles that can be arc welded which comprises blending with a hydrogen-reduced molybdenum powder about 0.2 to 0.5 percent by weight of titanium powder, said titanium powder being admixed with water in an amount of about 15 to 25 percent by weight based on the titanium, pressing the resulting mixture to form a dense compact, and vacuum sintering the compact at a temperature above about 1700° C. but below the melting point of said mixture.

References Cited in the file of this patent

UNITED STATES PATENTS

| 2,027,532 | Hardy | Jan. 14, 1936 |
| 2,491,866 | Kurtz et al. | Dec. 20, 1949 |

OTHER REFERENCES

Pipitz: "Powder Metallurgy Bulletin," 7, 3–6, April 1956, pages 146–148.